US012749760B2

(12) United States Patent
Yuan et al.

(10) Patent No.: US 12,749,760 B2
(45) Date of Patent: Sep. 29, 2026

(54) BATTERY PACK COMPRISING COVERING FOR CELL MODULE AND ELECTRICAL DEVICE

(71) Applicant: Ningde Amperex Technology Limited, Ningde (CN)

(72) Inventors: Hongwei Yuan, Dongguan (CN); Shenbo Wang, Dongguan (CN); Chao Jiang, Dongguan (CN); Weipan Xu, Dongguan (CN)

(73) Assignee: Ningde Amperex Technology Limited, Ningde (CN)

( * ) Notice: Subject to any disclaimer, the term of this patent is extended or adjusted under 35 U.S.C. 154(b) by 745 days.

(21) Appl. No.: 18/193,948

(22) Filed: Mar. 31, 2023

(65) Prior Publication Data

US 2023/0246285 A1 Aug. 3, 2023

Related U.S. Application Data

(63) Continuation of application No. PCT/CN2022/102458, filed on Jun. 29, 2022.

(30) Foreign Application Priority Data

Jun. 30, 2021 (CN) ........................ 202110738687.9

(51) Int. Cl.
*H01M 50/291* (2021.01)
*H01M 10/655* (2014.01)
(Continued)

(52) U.S. Cl.
CPC ....... *H01M 50/291* (2021.01); *H01M 10/655* (2015.04); *H01M 10/6561* (2015.04);
(Continued)

(58) Field of Classification Search
None
See application file for complete search history.

(56) References Cited

U.S. PATENT DOCUMENTS 8,951,653 B2 2/2015 Kurita
2011/0244293 A1* 10/2011 Khalighi ............. H01M 10/486 429/120
(Continued)

FOREIGN PATENT DOCUMENTS

CN 207320245 U 5/2018
CN 208939098 U 6/2019
(Continued)

OTHER PUBLICATIONS

Office Action issued on Dec. 11, 2024, in corresponding Chinese Application No. 202110738687.9, 18 pages.
(Continued)

*Primary Examiner* — Barbara L Gilliam
*Assistant Examiner* — Jordan E Berresford
(74) *Attorney, Agent, or Firm* — Maier & Maier, PLLC

(57) ABSTRACT

A battery pack includes a cell module, a covering, a first resin layer, and at least one first structural member. The cell module includes a plurality of cell assemblies stacked along a first direction, a first surface, a second surface, a first lateral face and a second lateral face, a first region and a second region located on two sides of the covering respectively along a second direction. The covering includes a first section, a second section, and a third section. The first section covers at least a part of the first lateral face. The second section covers at least a part of the second lateral face. The third section covers the first surface. The first resin layer is disposed in the first region. The first structural member is disposed between two adjacent cell assemblies to partition the two adjacent cell assemblies.

20 Claims, 10 Drawing Sheets

01

(51) Int. Cl.

| | |
|---|---|
| ***H01M 10/6561*** | (2014.01) |
| ***H01M 50/211*** | (2021.01) |
| ***H01M 50/242*** | (2021.01) |
| ***H01M 50/271*** | (2021.01) |
| ***H01M 50/293*** | (2021.01) |

(52) U.S. Cl.

CPC ....... *H01M 50/211* (2021.01); *H01M 50/242* (2021.01); *H01M 50/271* (2021.01); *H01M 50/293* (2021.01)

(56) References Cited

U.S. PATENT DOCUMENTS

| | | | | |
|---|---|---|---|---|
| 2014/0141307 | A1* | 5/2014 | Christian | H01M 10/625 429/99 |
| 2014/0356661 | A1 | 12/2014 | Yang | |
| 2015/0147638 | A1* | 5/2015 | Tamura | H01M 10/0585 429/185 |
| 2016/0197386 | A1* | 7/2016 | Moon | H01M 10/613 429/120 |
| 2016/0240835 | A1 | 8/2016 | Sakurai et al. | |
| 2016/0248062 | A1* | 8/2016 | Lee | H01M 50/24 |
| 2022/0285778 | A1* | 9/2022 | Takata | H01M 10/0481 |

FOREIGN PATENT DOCUMENTS

| | | | | |
|---|---|---|---|---|
| CN | 110518183 | A | 11/2019 | |
| CN | 112072043 | A | 12/2020 | |
| CN | 113471589 | A | 10/2021 | |
| CN | 218070027 | U | 12/2022 | |
| JP | 2007200712 | A | 8/2007 | |
| JP | 2012256467 | A | 12/2012 | |
| JP | 2016152138 | A | 8/2016 | |
| WO | WO-2012009145 | A2 * | 1/2012 | H01M 50/528 |
| WO | 2012165493 | A1 | 12/2012 | |
| WO | 2013172397 | A1 | 11/2013 | |
| WO | 2021072726 | A1 | 4/2021 | |

OTHER PUBLICATIONS

Office Action issued on Mar. 11, 2025, in corresponding Japanese Application No. 2023-580560, 6 pages.

Extended Search Report issued on Oct. 17, 2024, in corresponding European Application No. 22832123.8, 7 pages.

International Search Report mailed Sep. 23, 2022, in corresponding International Application No. PCT/CN2022/102458, 6 pages.

* cited by examiner

BATTERY PACK COMPRISING COVERING FOR CELL MODULE AND ELECTRICAL DEVICE

CROSS-REFERENCE TO RELATED APPLICATIONS

This application is a continuation application of International Application No. PCT/CN2022/102458, filed on Jun. 29, 2022, which claims the benefit of priority of Chinese patent application 202110738687.9, filed on Jun. 30, 2021, the contents of which are incorporated herein by reference in its entirety

TECHNICAL FIELD

This application relates to the technical field of batteries, and in particular, to a battery pack and an electrical device.

BACKGROUND

A battery commonly available in the market at present contains a single cell. Due to relatively low energy in a single cell, a plurality of cells are usually packaged to form a new battery pack to increase the aggregate energy. The new battery pack solves the problem of low battery energy. A plurality of cells are usually sealed and fixed by a pouring sealant.

In a process of implementing this application, the inventor hereof finds that the cells generate a lot of heat during operation. When all the cells are sealed with the pouring sealant, the heat generated by the cells can hardly be expelled, thereby leading to a high internal temperature of the entire battery pack and safety hazards.

SUMMARY

In view of the foregoing problems, some embodiments of this application provide a battery pack and an electrical device to alleviate the problems such as inefficient heat dissipation of the cell and a relatively high internal temperature of the entire battery pack.

According to one aspect of embodiments of this application, a battery pack is provided, including a cell module, at least one covering, a first resin layer, and at least one first structural member. The cell module includes a plurality of cell assemblies stacked along a first direction. The cell module includes a first surface, a second surface, a first lateral face and a second lateral face, the first surface and the second surface disposed opposite to each other along the first direction, the first lateral face and, the second lateral face that are disposed opposite to each other along a third direction. Each covering includes a first section, a second section, and a third section connected to the first section and the second section. The first section covers at least a part of the first lateral face. The second section covers at least a part of the second lateral face. The third section covers the first surface. The cell module includes a first region and a second region, along a second direction, the first region and the second region located on two sides of one of the at least one covering respectively. The first resin layer is formed by disposing a first resin material in and then fixing the first resin material to the first region. The first resin layer is bonded to the covering. The at least one first structural member is disposed between two adjacent cell assemblies to partition the two adjacent cell assemblies and form a channel. A part of the channel located in the second region, includes a clearance.

The covering can restrict a pouring sealant from flowing into the channel. The channel is ventilative to outside air. The channel can expel the heat, which is generated in the battery pack, out of the battery pack to reduce the internal temperature of the battery pack. In addition, an external blower or an air exhauster may be disposed at the channel to accelerate ventilation in the channel, improve heat dissipation of the battery pack, and in turn, reduce the internal temperature of the entire battery pack.

In an optional implementation, the battery pack includes a battery pack housing. The battery pack housing contains an accommodation cavity, a first through-hole, and a second through-hole. The first through-hole and the second through-hole are disposed opposite to each other along the third direction. Both the first through-hole and the second through-hole communicate with the accommodation cavity. The cell module is accommodated in the accommodation cavity. The first through-hole and the second through-hole at least partly overlap the channel in the third direction.

In an optional implementation, the battery pack housing includes a first housing and a second housing that are connected to each other. The first housing and the second housing form the accommodation cavity of the cell module. The first housing contains a third through-hole that communicating with the accommodation cavity. The third through-hole is located above the first region along an opposite direction of the first direction.

In an optional implementation, wherein the first section contain a recessed portion, the second section contain a recessed portion, and a lateral edge of the cell module along the third direction is accommodated in the recessed portion.

In an optional implementation, the cell assembly includes at least one cell. Each cell includes an electrode assembly, a cell housing configured to accommodate the electrode assembly, and a tab connected to the electrode assembly and extending out of the cell housing. The cell housing includes a first part and a second part, the first part configured to accommodate the electrode assembly, the second part extending outward from the first part. The tab extends out of the cell housing from the second part. A part that is of the tab and that extending out of the cell housing is located in the first region.

In an optional implementation, the battery pack further includes a heat transfer piece, and the heat transfer piece covers an outer surface that is of each cell assembly and that is located in the second region. The heat transfer piece may be configured to conduct outward the heat generated by the cell located in the second region, and then expel the heat out of the battery pack through the channel between the cell assemblies, thereby reducing the internal temperature of the battery pack.

In an optional implementation, the heat transfer piece covers a part of a surface that is of each cell assembly and that is located in the first region, and the heat transfer piece covers a part of a surface that is of each cell assembly and that is located in the third region. The heat transfer piece may be configured to conduct outward the heat generated by the cells located in the first region and the third region, and then expel the heat out of the battery pack through the channel between the cell assemblies, thereby reducing the internal temperature of the battery pack.

In an optional implementation, the covering includes a first covering and a second covering, the first covering and the second covering are disposed in sequence along an opposite direction of the second direction. The cell module further includes a third region. The first region, the second region, and the third region are disposed in sequence along the opposite direction of the second direction. The first covering is located between the first region and the second region, and the second covering is located between the second region and the third region.

In an optional implementation, the battery pack further includes a second resin layer, formed by disposing a second resin material in and then fixing the second resin material to the third region. The second resin layer is bonded to the second covering. A part of the channel, which is located between the first covering and the second covering, includes a clearance.

In an optional implementation, the covering includes a fourth section that connects the first section to the second section. The fourth section is disposed opposite to the third section, and the fourth section covers the second surface.

In an optional implementation, the covering has an annular structure.

In an optional implementation, each covering partly overlaps the first through-hole and the second through-hole in the third direction, thereby helping to reduce foreign substances that enter the first region and the third region from the outside.

In an optional implementation, the first section and the second section each contain a recessed portion, and a lateral edge of the cell module along the third direction is accommodated in the recessed portion. The recessed portion may be configured to limit the position of the cell module. In addition, the recessed portion may store some glue to facilitate bonding and fixing of the cell.

In an optional implementation, a bottom of the recessed portion includes a bonding bulge that extends toward the cell module. The bonding bulge slows down the flow of glue in the recessed portion, and facilitates bonding and fixing of the cell module.

In an optional implementation, the battery pack further includes an adapter assembly. The adapter assembly includes an adapter plate and an adapter piece. The adapter plate is disposed on a first end of the cell. The adapter piece is disposed on the adapter plate, and the adapter piece is connected to the cell. The adapter assembly may be configured to connect an external component.

In an optional implementation, the first section contains a seventh through-hole. The second section contains an eighth through-hole. The seventh through-hole is disposed opposite to the eighth through-hole. The seventh through-hole and the eighth through-hole at least partly overlap the channel in the third direction.

In an optional implementation, the battery pack further includes a printed circuit board. The printed circuit board is disposed on a surface that is of the battery pack housing and that is oriented back from the cell module. The printed circuit board is electrically connected to the adapter plate. The printed circuit board may be configured to control data such as voltage of the cell.

According to another aspect of embodiments of this application, an electrical device is provided, including the battery pack described above.

Beneficial effects of some embodiments of this application are: In the some embodiments of this application, a cell module, at least one covering, a first resin layer, and at least one first structural member are disposed. The cell module includes a plurality of cell assemblies stacked along a first direction. The cell module includes a first surface and a second surface that are disposed opposite to each other along the first direction, and includes a first lateral face and a second lateral face that are disposed opposite to each other along a third direction. Each covering includes a first section, a second section, and a third section connected to the first section and the second section. The first section covers at least a part of the first lateral face. The second section covers at least a part of the second lateral face. The third section covers the first surface. The cell module includes a first region and a second region that are located on two sides of one of the at least one covering respectively along a second direction. The first direction, the second direction, and the third direction are perpendicular to one another. The first resin layer is formed by disposing a first resin material in and then fixing the first resin material to the first region. The first resin layer is bonded to the covering. In addition, the at least one first structural member is disposed between two adjacent cell assemblies to partition the two adjacent cell assemblies and form a channel. A part of the channel, which is located in the second region, includes a clearance. The channel is ventilative to outside air. The channel can expel the heat, which is generated in the cell assembly, out of the battery pack to reduce the internal temperature of the battery pack. In addition, an external blower or an air exhauster may be disposed at the channel to accelerate ventilation in the channel, improve heat dissipation of the battery pack, and in turn, reduce the internal temperature of the entire battery pack.

BRIEF DESCRIPTION OF THE DRAWINGS

To describe the technical solutions in the specific some embodiments of this application or the prior art more clearly, the following outlines the drawings that need to be used in the descriptions of the specific some embodiments of this application or the prior art. In all the drawings, similar elements or parts are generally identified by similar reference numerals. The elements or parts in the drawings are not necessarily drawn to scale.

Figure 1:
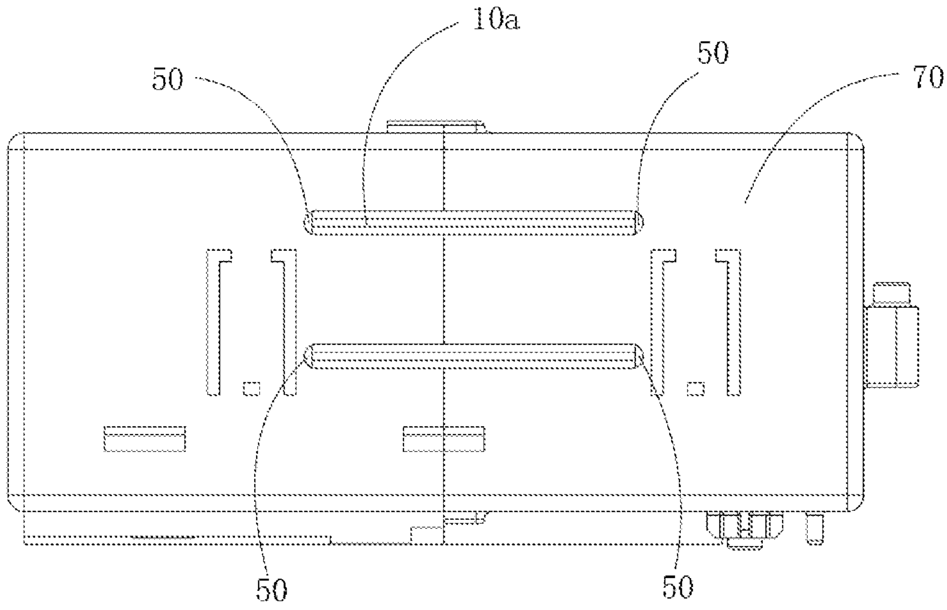
FIG. 1 is a schematic assembling diagram of an overall structure of a battery pack according to an embodiment of this application.

Reference numerals: 10. cell module; 10*a*. channel; 10*b*. first surface; 10*c*. second surface; 10*d*. first lateral face; 10*e*. second lateral face; 11. cell assembly; 11*a*. cell; 12. first region; 13. second region; 14. third region; 111. electrode assembly; 112. cell housing; 1121. second part; 1122. first part; 101. first cell assembly; 102. second cell assembly; 103. third cell assembly; 113. tab; 113*a*. positive tab; 113*b*. negative tab; 20. first resin layer; 30. second resin layer; 40. first structural member; 50. covering; 51. first covering; 52. second covering; 501. first section; 5011. seventh through-hole; 502. second section; 5021. eighth through-hole; 503. third section; 504. recessed portion; 5041. bonding bulge; 505. fourth section; 70. battery pack housing; 70*a*. accommodation cavity; 701. first through-hole; 702. second through-hole; 703. first sidewall; 704. second sidewall; 705. third through-hole; 706. fourth through-hole; 71. first housing; 72. second housing; 80. adapter assembly; 801. adapter plate; 8011. second opening; 8012. fifth through-hole; 8013. sixth through-hole; 802. adapter piece; 8021. first adapter piece; 8022. second adapter piece; 803. conductive sheet; 90. printed circuit board; 100. heat transfer piece.

DETAILED DESCRIPTION

For ease of understanding this application, the following describes this application in more detail with reference to drawings and specific some embodiments. It needs to be noted that an element referred to herein as “fixed to” another element may directly exist on the other element, or may be fixed to the other element through one or more intermediate elements. An element referred to herein as “connected to” another element may be connected to the other element directly or through one or more intermediate elements. The terms “vertical”, “horizontal”, “left”, “right”, and other similar expressions used herein are merely for ease of description.

Unless otherwise defined, all technical and scientific terms used herein have the same meanings as what is generally understood by a person skilled in the technical field of this application. The terms used in the specification of this application are merely intended to describe specific some embodiments but not to limit this application. The term “and/or” used herein is intended to include any and all combinations of one or more related items preceding and following the term.

In order to describe the structure of a battery pack 01 more clearly, a structure of the battery pack 01 will be described by using X, Y, and Z coordinate axes. The X-axis, the Y-axis, and Z-axis are perpendicular to one other.

Figure 2:
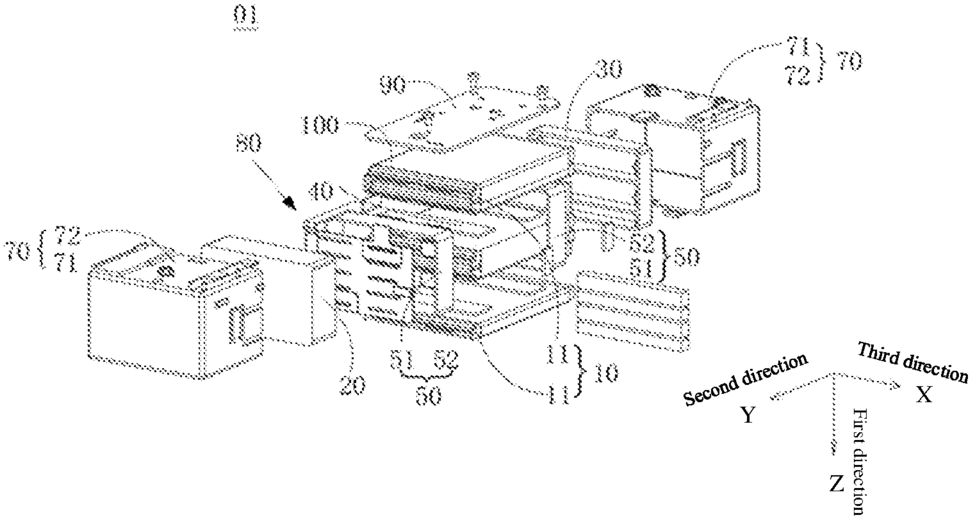
FIG. 2 is a schematic exploded view of an overall structure of a battery pack according to an embodiment of this application.
Figure 3:
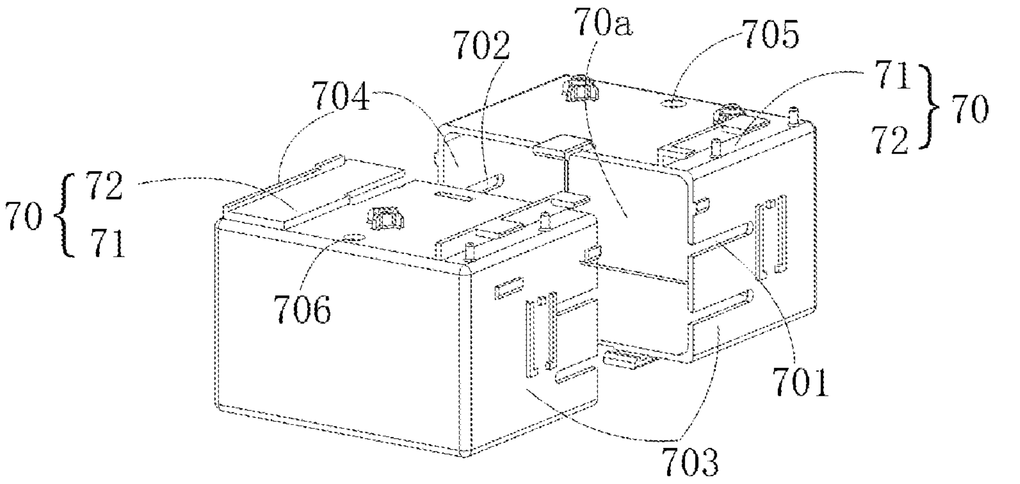
FIG. 3 is a schematic exploded view of an overall structure of a battery pack housing of a battery pack according to an embodiment of this application.

Referring to FIG. 1 to FIG. 3, the battery pack 01 includes a cell module 10, a first resin layer 20, at least one first structural member 40, and at least one covering 50. The cell module 10 includes a plurality of cell assemblies 11 stacked in a first direction Z. The at least one covering 50 covers an outer surface of the cell module 10. Along a second direction Y, the first resin layer 20 is disposed at one end of the cell module 10. The first resin layer 20 includes a first resin material. The first structural member 40 is disposed inside the cell module 10 to partition the interior of the cell module 10 to form channel 10*a*. The channel 10*a* is ventilative to outside air. The channel 10*a* can expel the heat, which is generated in the battery pack 01, out of the battery pack 01 to reduce the internal temperature of the battery pack 01. In addition, an external blower or an air exhauster may be disposed at the channel 10*a* to accelerate ventilation in the channel 10*a*, improve heat dissipation of the battery pack 01, and in turn, reduce the internal temperature of the entire battery pack 01.

The battery pack 01 further includes a second resin layer 30, a battery pack housing 70, an adapter assembly 80, a printed circuit board 90, and a heat transfer piece 100. The battery pack housing 70 may be configured to accommodate the cell module 10. The second resin layer 30 includes a second resin material. Along the second direction Y, the second resin layer 30 is disposed at the other end of the cell module 10. The adapter assembly 80 is disposed at one end of the cell module 10, and is electrically connected to the cell module 10. Optionally, the adapter assembly 80 and the first resin layer 20 are disposed at the same end of the cell module 10. Along the first direction Z, the printed circuit board 90 is disposed on a surface that is of the battery pack housing 70 and that is oriented back from the cell module 10. The printed circuit board 90 is electrically connected to the adapter assembly 80. In addition, The heat transfer piece 100 covers the cell assembly 11. The heat transfer piece 100 is located between the covering 50 and the cell assembly 11.

For the foregoing battery pack housing 70, as shown in FIG. 2 and FIG. 3, the battery pack housing 70 includes a first housing 71 and a second housing 72. The first housing 71 contains a first cavity (not shown). The second housing 72 contains a second cavity (not shown). The first housing 71 is connected to the second housing 72. The first cavity and the second cavity form an accommodation cavity 70*a* of the battery pack housing 70. The accommodation cavity 70*a* may be configured to accommodate the cell module 10.

The battery pack housing contains a first through-hole 701 and a second through-hole 702. The first through-hole 701 is disposed opposite to the second through-hole 702 along a third direction X. The battery pack housing 70 includes a first sidewall 703 and a second sidewall 704 that are disposed opposite to each other along the third direction X. The first through-hole 701 is located on the first sidewall 703. The second through-hole 702 is located on the second sidewall 704. The first through-hole 701 and the second through-hole 702 at least partly overlap the channel 10*a* in the third direction X. The first through-hole 701 and the second through-hole 702 facilitate ventilation between the channel 10*a* and the outside air, promote air circulation in the channel 10*a*, and improve heat dissipation of the battery pack.

Understandably, the locations of the first through-hole 701 and the second through-hole 702 are not limited to a position on the first sidewall 703 and the second sidewall 704. The first through-hole 701 and the second through-hole 702 may be disposed at other positions instead. The locations of the first through-hole 701 and the second through-hole 702 may be determined according to the location of the channel 10*a*. For example, when the opening of the channel 10*a* faces the second direction Y, the first through-hole 701 and the second through-hole 702 are disposed on other sidewalls of the battery pack housing along the second direction Y, and at least partly overlap the channel 10*a* in the second direction Y.

In some embodiments, the first housing 71 contains a third through-hole 705. The third through-hole 705 communicating with the accommodation cavity 70*a*. Along an opposite direction of the first direction Z, the third through-hole 705 is located above the first region 12. The third through-hole 705 makes it convenient to pour the first resin material into the first region 12.

In some embodiments, the second housing 72 contains a fourth through-hole 706. The fourth through-hole 706 communicating with the accommodation cavity 70*a*. Along an opposite direction of the first direction Z, the fourth through-hole 706 is located above the second region 13. The fourth through-hole 706 makes it convenient to pour the second resin material into the second region 13.

The structure of the battery pack housing 70 is not limited to the structure formed by connecting the first housing 71 and the second housing 72. The structure of the battery pack housing may be integrally formed instead. The integrally formed battery pack housing contains a first opening (not shown) that communicating with the accommodation cavity 70*a*. The first opening makes it convenient to place the cell module 10 into the accommodation cavity 70*a*.

Figure 4:
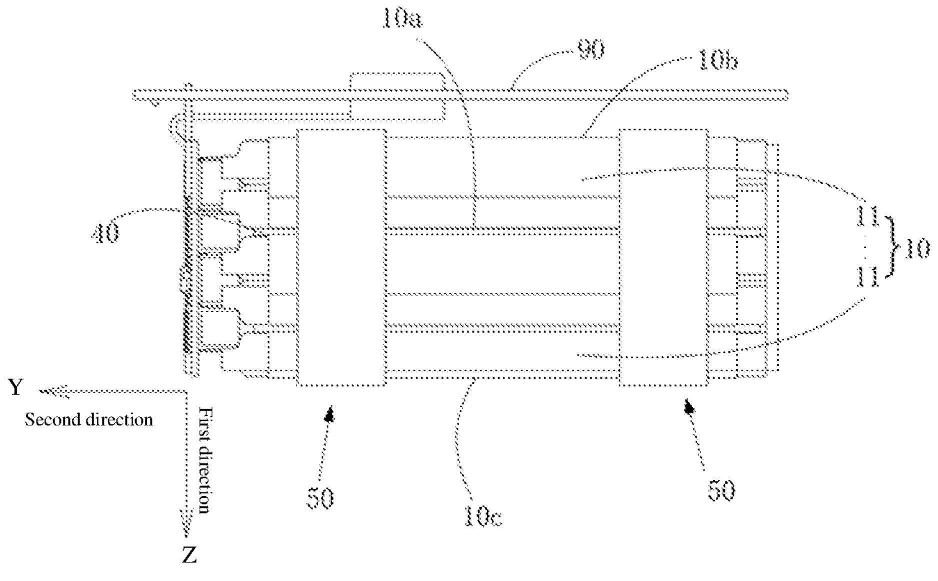
FIG. 4 is a schematic side view of a partial internal structure of a battery pack according to an embodiment of this application.
Figure 5:
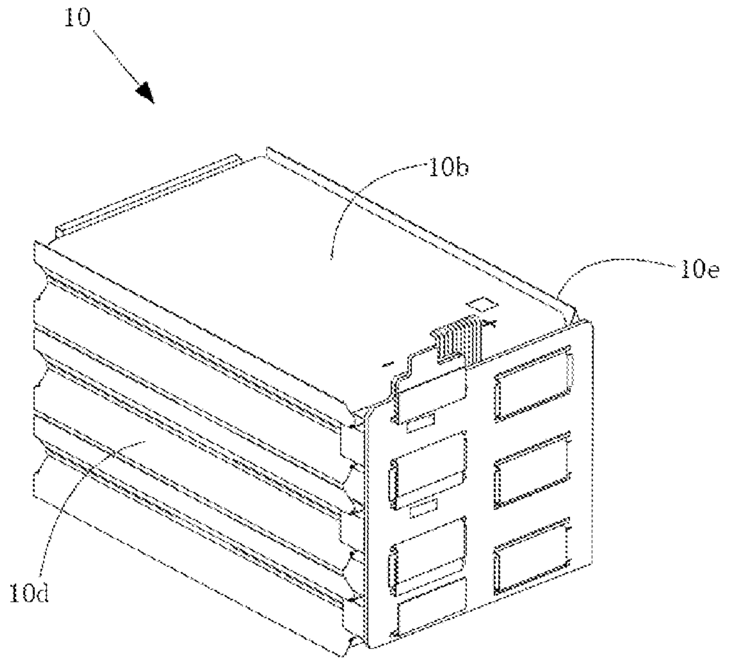
FIG. 5 is a schematic assembling diagram of a partial structure of a battery pack according to an embodiment of this application.
Figure 6:
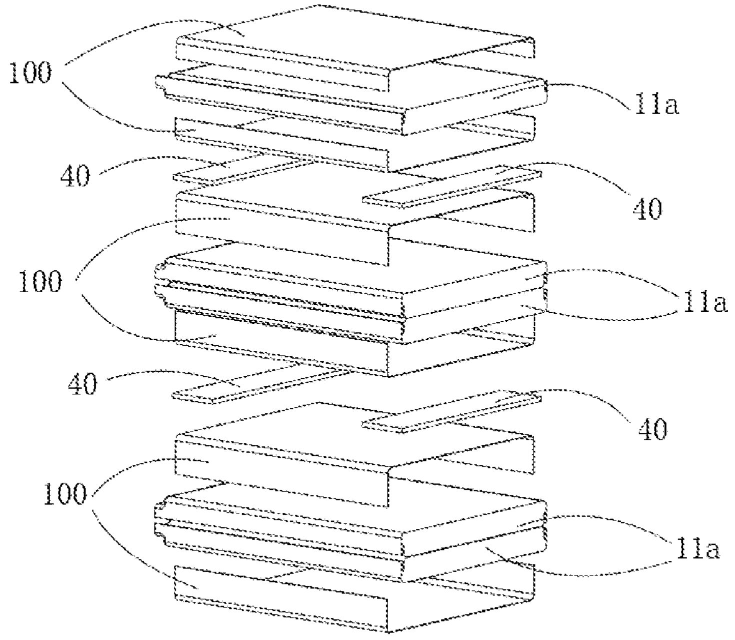
FIG. 6 is a schematic exploded view of a plurality of cell modules of a battery pack according to an embodiment of this application.

As shown in FIG. 4 and FIG. 6, the cell module 10 includes a plurality of cell assemblies 11 stacked along the first direction Z. The cell module 10 includes a first surface 10*b* and a second surface 10*c* that are disposed opposite to each other along the first direction Z, and includes a first lateral face 10*d* and a second lateral face 10*e* that are disposed opposite to each other along the third direction X.

Figure 7:
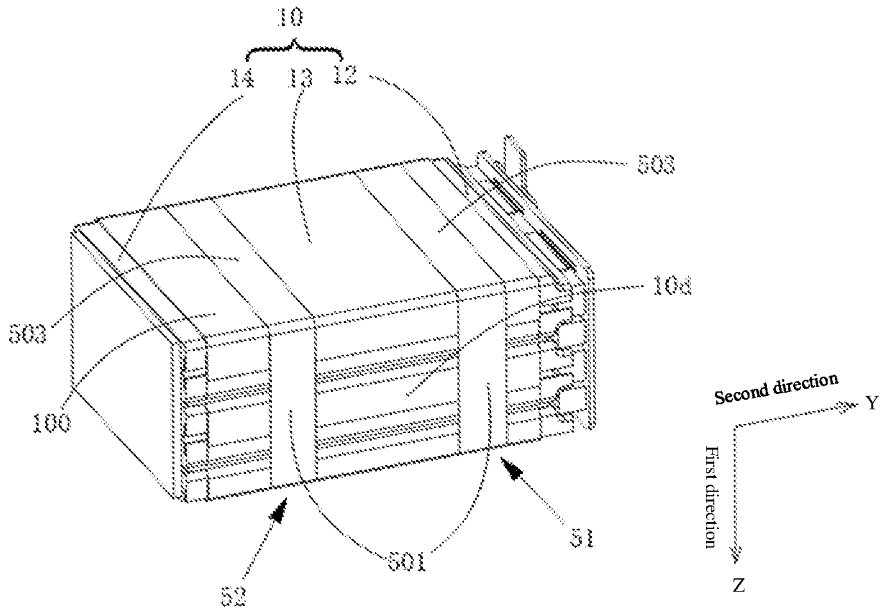
FIG. 7 is a schematic assembling diagram of a partial structure of a battery pack according to an embodiment of this application.
Figure 8:
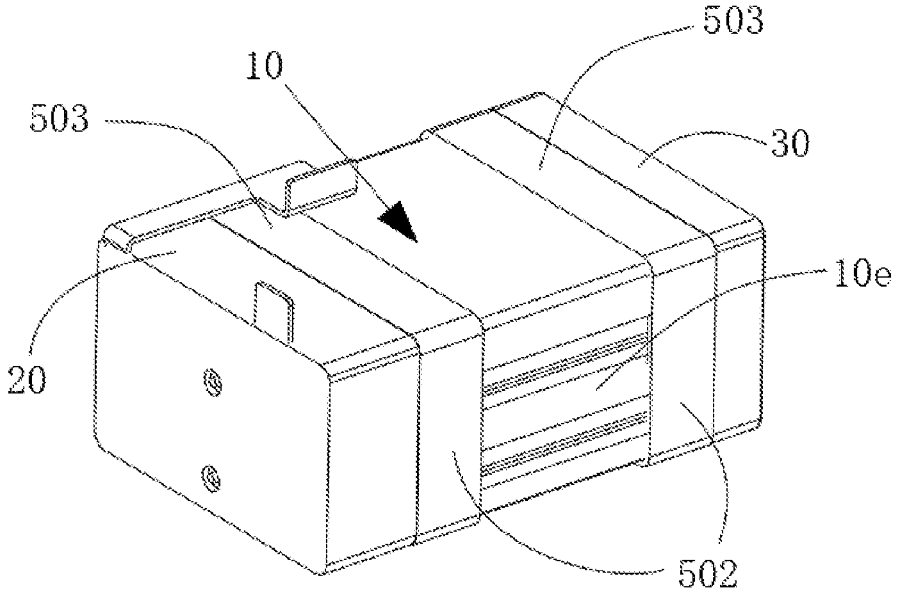
FIG. 8 is a schematic assembling diagram of another partial structure of a battery pack according to an embodiment of this application.

In some embodiments, as shown in FIG. 7 and FIG. 8, the cell module 10 includes a first region 12, a second region 13, and a third region 14. The first region 12, the second region 13, and the third region 14 are disposed in sequence along an opposite direction of the second direction Y. The first region 12 may be configured to form a first resin layer 20 after the first resin material is disposed. The second region 13 may be configured to dispose the channel 10*a*. The third region 14 may be configured to form a second resin layer 30 after the second resin material is disposed.

Figure 9:
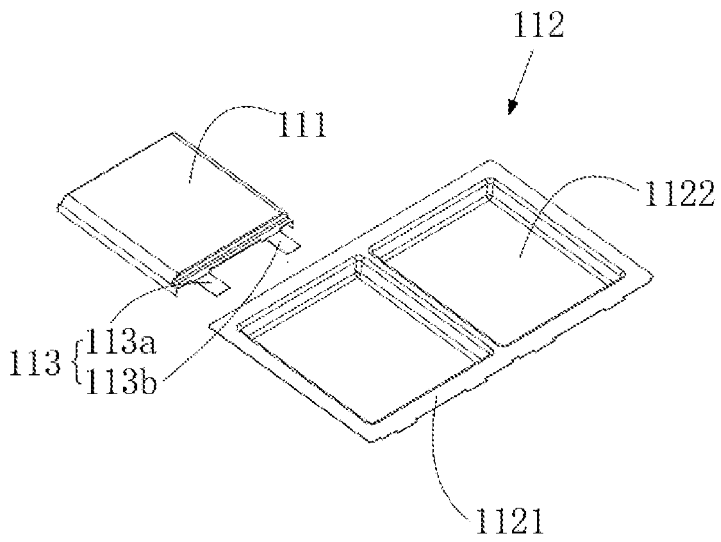
FIG. 9 is a schematic exploded view of a structure of a single cell of a battery pack according to an embodiment of this application.
Figure 10:
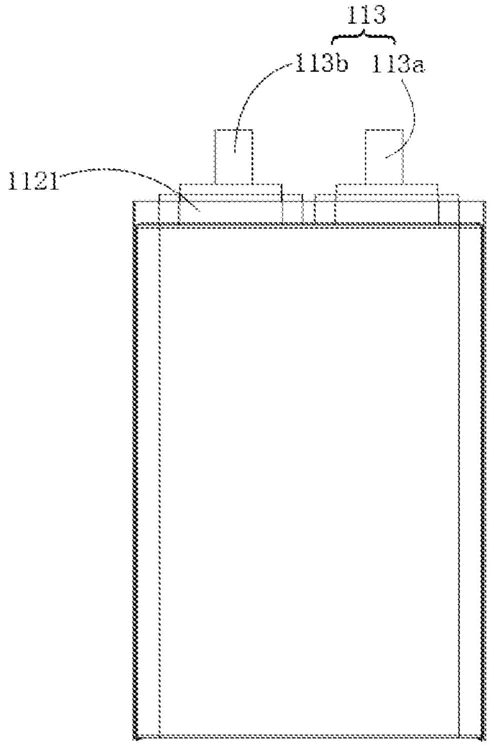
FIG. 10 is a schematic diagram of an overall structure of a single cell of a battery pack according to an embodiment of this application.

As shown in FIG. 9 and FIG. 10, the cell assembly 11 includes at least one cell. Each cell includes an electrode assembly 111, a cell housing 112 configured to accommodate the electrode assembly 111, and a tab 113 connected to the electrode assembly 111. The cell housing 112 includes a first part 1122 configured to accommodate the electrode assembly and a second part 1121 extending outward from the first part 1122. The tab 113 extends out of the cell housing 112 from the second part 1121 along the second direction Y. A part that is of the tab 113 and that extending out of the cell housing is located in the first region 12. The second part 1121 seals the electrode assembly 111 accommodated in the first part 1122, and restricts external moisture from entering the cell housing 112. Optionally, the tab 113 includes a positive tab 113*a* and a negative tab 113*b*. The positive tabs 113*a* of the plurality of cells are connected to each other, and the negative tabs 113*b* of the plurality of cells are connected to each other.

After the electrode assembly 111 is disposed in the cell housing 112, the second part 1121 of the cell housing 112 is bonded and fixed, so that the electrode assembly 111 is sealed in the cell housing 112. The bonded and sealed second part 1121 forms a top seal of the cell. In addition, one end of the tab 113 of the cell is connected to the electrode assembly 111, and the other end of the tab 113 protrudes from the second part 1121 along the second direction Y.

Figure 11:
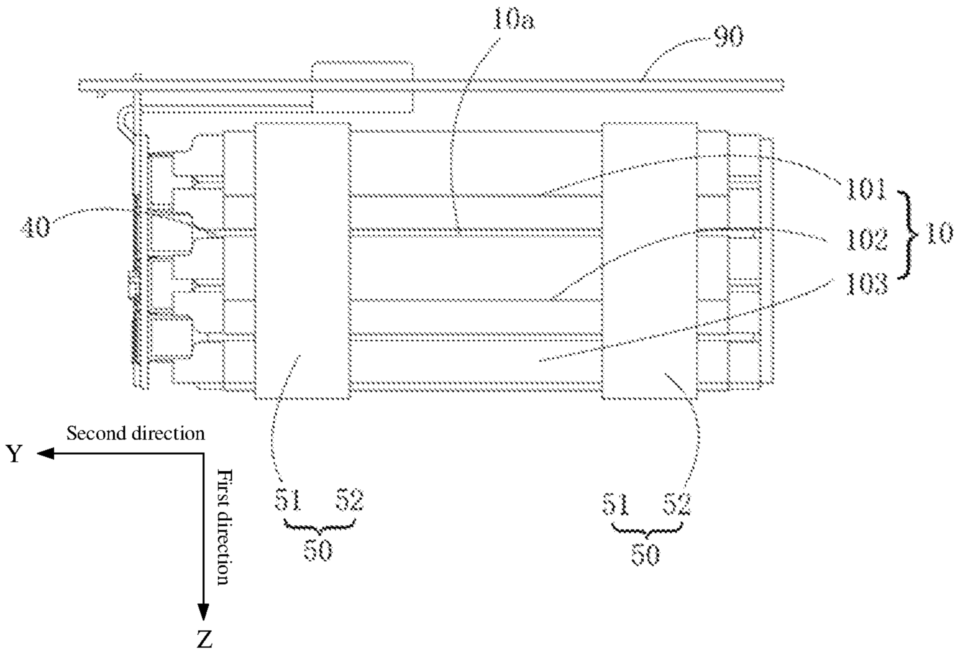
FIG. 11 is a schematic side view of a plurality of cell modules stacked in a stacking sequence in a battery pack according to an embodiment of this application.
Figure 12:
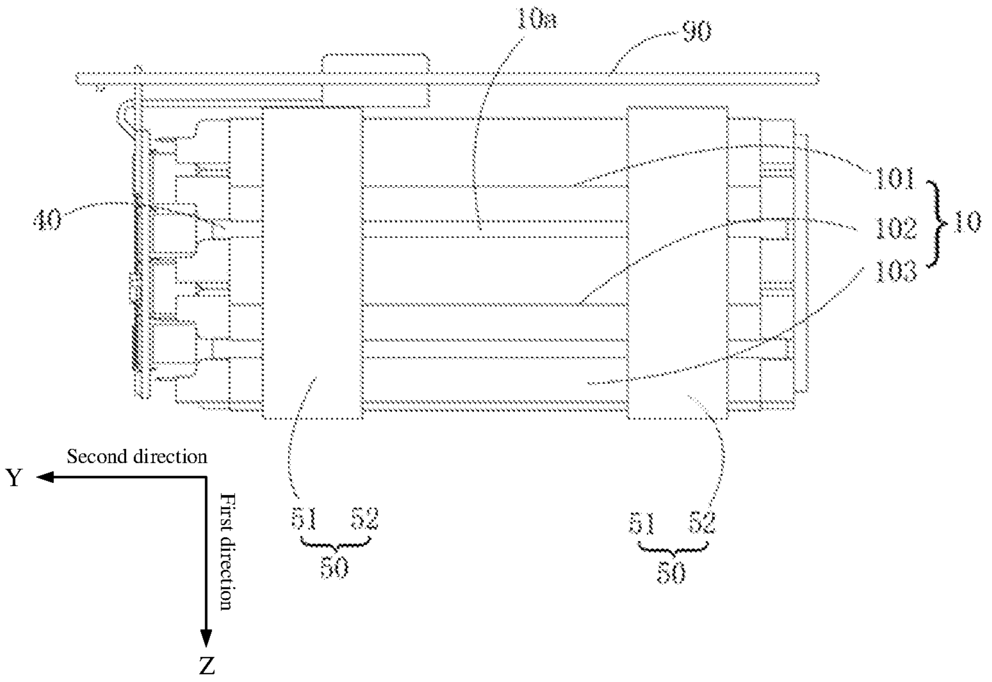
FIG. 12 is another schematic side view of a plurality of cell modules stacked in a stacking sequence in a battery pack according to an embodiment of this application.

In some embodiments, as shown in FIG. 11 and FIG. 12, the cell assembly 11 includes a first cell assembly 101, a second cell assembly 102, and a third cell assembly 103. The first cell assembly 101, the second cell assembly 102, and the third cell assembly 103 are stacked in sequence along the first direction Z. Optionally, the number of cells in the first cell assembly 101 is 2, the number of cells in the second cell assembly 102 is 2, and the number of cells in the third cell assembly 103 is 1. Optionally, along the first direction Z, a width of the channel 10*a* between the three cell assemblies 11, that is, the first cell assembly 101, the second cell assembly 102, and the third cell assembly 103, is 3 mm. In some other embodiments, the width of the channel 10*a* along the first direction Z is 1.6 mm.

Figure 13:
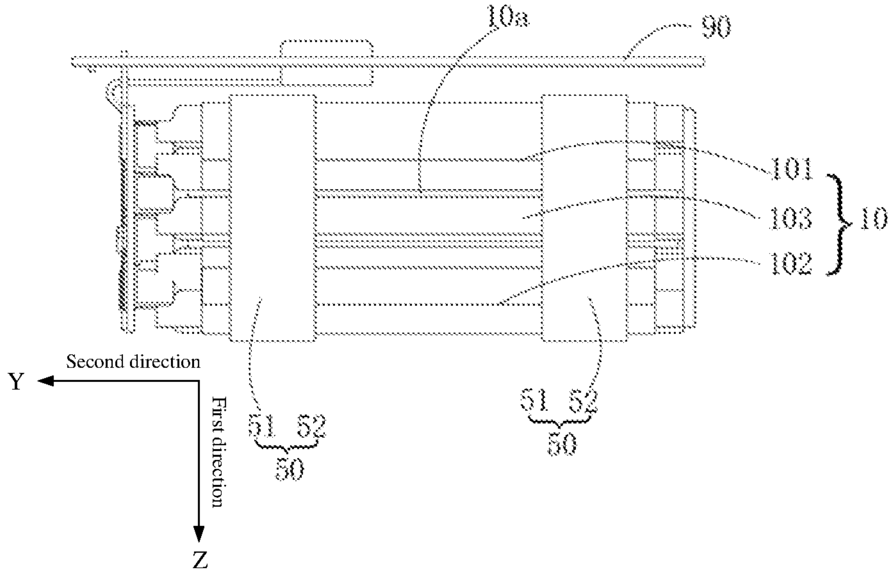
FIG. 13 is a schematic side view of a plurality of cell modules stacked in another stacking sequence in a battery pack according to an embodiment of this application.
Figure 14:
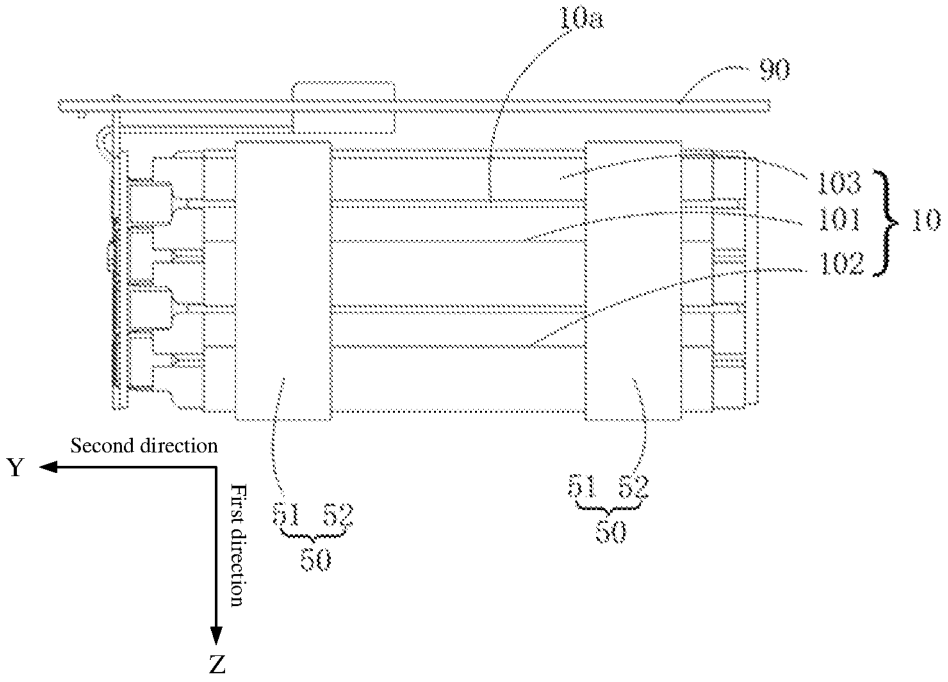
FIG. 14 is a schematic side view of a plurality of cell modules stacked in still another stacking sequence in a battery pack according to an embodiment of this application.

Understandably, the stacking manner between the first cell assembly 101, the second cell assembly 102, and the third cell assembly 103 is not limited to the foregoing arrangement. For example, as shown in FIG. 13 to FIG. 14, the three cell assemblies are stacked along the first direction Z in a sequence from the third cell assembly 103 to the first cell assembly 101 and then to the second cell assembly 102. For another example, the three cell assemblies are stacked along the first direction Z in a sequence from the first cell assembly 101 to the third cell assembly 103 and then to the second cell assembly 102.

In some embodiments, the first structural member 40 includes foam. The foam is compressible. The foam provides an expansion space for the expansion of the cell, and helps to improve the service life of the battery pack 01.

Figure 15:
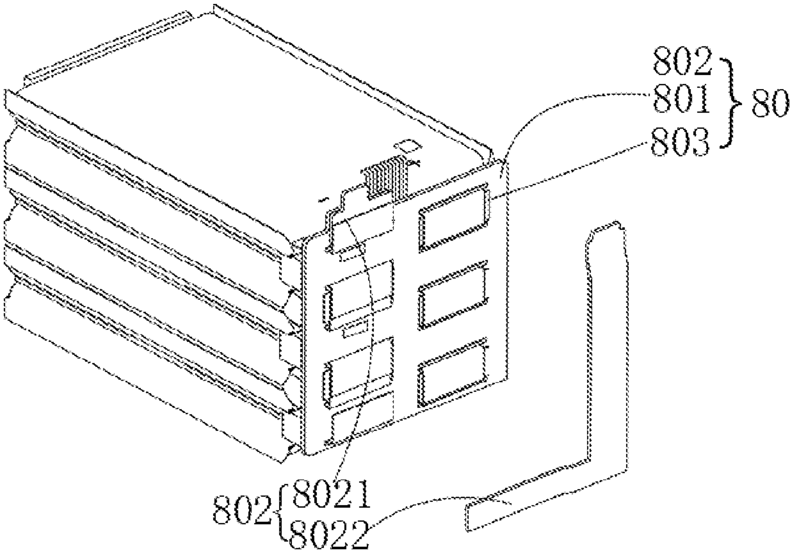
FIG. 15 is a schematic assembling diagram of an adapter assembly and a cell module of a battery pack according to an embodiment of this application.

For the foregoing adapter assembly 80, as shown in FIG. 2 and FIG. 15, the adapter assembly 80 includes an adapter plate 801, an adapter piece 802, and a conductive sheet 803. The adapter plate 801 is disposed at one end that is of the cell and that is close to the tab 113. The adapter piece 802 is disposed on the adapter plate 801. The conductive sheet 803 is disposed on a surface that is of the adapter plate 801 and that is oriented back from the cell. The adapter assembly 80 may be configured to connect external components. For example, the external components may include a safety device. When an internal current of the battery exceeds a specified value, the safety device can cut off the circuit to effectively protect the internal circuit of the battery. In some embodiments, the safety device is a fuse. When the internal current of the battery exceeds a specified value, the fuse can cut off the circuit to effectively protect the internal circuit of the battery. The conductive sheet 803 is configured to connect to the cell, and implement electrical connection between the adapter plate 801 and the cell.

In some embodiments, the adapter plate 801 is a printed circuit board (PCB). The PCB may be used as a carrier of electronic components, thereby facilitating the connection between the internal components of the battery pack.

Figure 16:
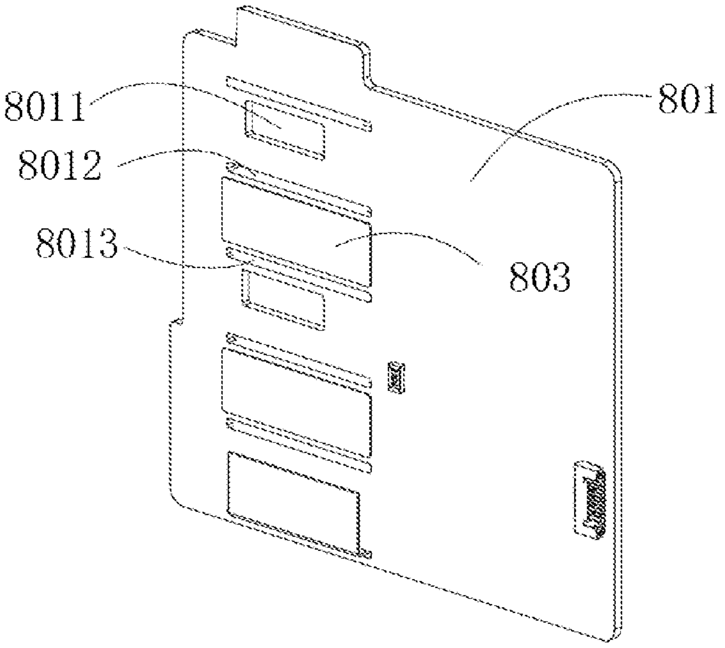
FIG. 16 is a schematic structural diagram of an adapter plate of an adapter assembly of a battery pack according to an embodiment of this application.

In some embodiments, as shown in FIG. 16, a second opening 8011 is provided on the adapter plate 801. During welding between the tab 113 and the conductive sheet 803, the second opening 8011 may be configured to dissipate heat for the adapter plate 801, so as to prevent the adapter plate 801 from being damaged by overheat. When pouring the first resin material into the first region 20, the second opening 8011 facilitates the flow of the first resin material and shortens the curing time of the first resin material.

In some embodiments, a fifth through-hole 8012 and a sixth through-hole 8013 are provided on the adapter plate 801. The fifth through-hole 8012 and the sixth through-hole 8013 are located on two sides of the conductive sheet 803 respectively. The fifth through-hole 8012 and the sixth through-hole 8013 make it convenient for the tab 113 of the cell to pass through the holes and connect to the adapter plate 801.

In some embodiments, as shown in FIG. 15, the adapter piece 802 includes a first adapter piece 8021 and a second adapter piece 8022. The first adapter piece 8021 is connected to one tab 113 of the cell, and the second adapter piece 8022 is connected to the other tab 113 of the cell. Optionally, the adapter piece 802 includes a copper bar. Further, the first adapter piece 8021 may be a main positive copper bar, and the second adapter piece 8022 may be a main negative copper bar. Understandably, the first adapter piece 8021 is not limited to being a main positive copper bar, and the second adapter piece 8022 is not limited to being a main negative copper bar. The first adapter piece 8021 and the second adapter piece 8022 are of opposite electrical polarities. The adapter piece 802 may include a plurality of first adapter pieces 8021 and second adapter pieces 8022. The plurality of cells may be connected to each other in series or parallel. The plurality of first adapter pieces 8021 may be connected to a positive tab 113*a* or negative tab 113*b* of the cell. The plurality of second adapter pieces 8022 may be connected to the negative tab 113*b* or positive tab 113*a* of the cell.

The polarities of the tabs 113 that are of the cells and that are connected to the first adapter pieces 8021 and the second adapter pieces 8022 respectively are not limited. In addition, the first adapter piece 8021 may be connected to the positive tab 113*a* of the cell, and therefore, the second adapter piece 8022 is connected to the negative tab 113*b* of the cell. The polarities of the tabs 113 connected to the first adapter piece 8021 and the second adapter piece 8022 respectively are not limited, as long as the polarity of the tab 113 connected to the first adapter piece 8021 is opposite to the polarity of the tab connected to the second adapter piece 8022.

For the printed circuit board 90, as shown in FIG. 2, the printed circuit board 90 is disposed on a surface that is of the battery pack housing 70 and that is oriented back from the cell assembly 11. The printed circuit board 90 is electrically connected to the adapter plate 801.

In some embodiments, the printed circuit board 90 is a battery management system (BMS) board. The BMS board may be configured to control data such as the voltage of the cell.

As shown in FIG. 7 and FIG. 8, the covering 50 includes a first section 501, a second section 502, and a third section 503 connected to the first section 501 and the second section 502. Along the third direction X, the first section 501 is disposed opposite to the second section 502. Along the second direction Y, the length of the first section 501 is less than the length of the cell assembly 11. The first section 501 covers at least a part of the first lateral face 10*d*. Along the second direction Y, the length of the second section 502 is less than the length of the cell assembly 11. The second section 502 covers at least a part of the second lateral face 10*e*. Along the second direction Y, the length of the third section 503 is less than the length of the cell assembly 11. The third section 503 covers at least a part of the first surface 10*b*. The covering 50 partitions the cell module 10 to form a first region 12 and a second region 13. The covering 50 may be configured to limit the position of the cell assembly 11 and alleviate shaking of the cell assembly 11.

In some embodiments, the covering 50 partly overlaps the first through-hole 701 and the second through-hole 702 in the third direction X, thereby helping to reduce foreign substances that enter the first region 12 and the third region 14 from the outside. The foreign substances coming from the outside may include dust particles and the like.

Figure 17:
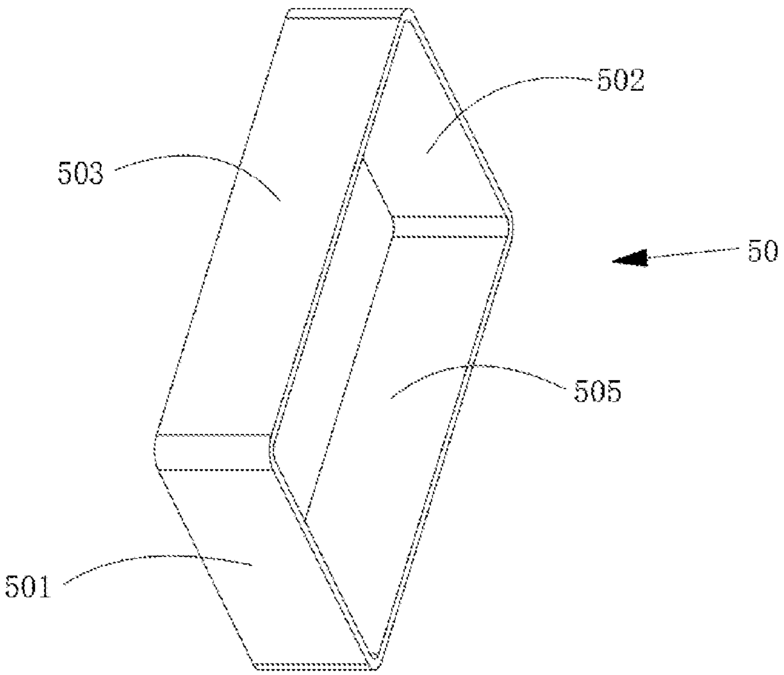
FIG. 17 is a schematic structural diagram of a covering of a battery pack according to an embodiment of this application.

In some embodiments, as shown in FIG. 17, the covering 50 includes a fourth section 505 connected to the first section 501 and the second section 502. Along the first direction Z, the fourth section 505 is disposed opposite to the third section 503. Along the second direction Y, the length of the fourth section 505 is less than the length of the cell assembly 11. The fourth section 505 covers at least a part of the second surface 10*c*, and may be further configured to limit the position of the cell assembly 11. Optionally, the covering 50 has an annular structure.

In some embodiments, as shown in FIG. 7 and FIG. 17, the covering 50 includes a first covering 51 and a second covering 52 that are disposed in sequence along an opposite direction of the second direction Y. The first covering 51 is spaced apart from the second covering 52. The first covering 51 is located between the first region 12 and the second region 13, and the second covering 52 is located between the second region 13 and the third region 14. A part of the channel 10*a*, which is located in the second region 13, includes a clearance. For the first resin material disposed in the first region 12, the first covering 51 can restrict the first resin material from flowing into the second region 13. For the first resin material disposed in the third region 14, the second covering 52 can restrict the first resin material from flowing into the second region 13. Optionally, the first covering 51 and the second covering 52 are sealing foam. Optionally, the first covering 51 is an integrally formed structure, and the second covering 52 is an integrally formed structure. Optionally, the first covering 51 includes a first section 501, a second section 502, a third section 503, and a fourth section 505. Optionally, the second covering 52 includes a first section 501, a second section 502, a third section 503, and a fourth section 505.

Optionally, an adhesive is disposed on an inner surface that is of the covering 50 and that is connected to the cell assembly 11, thereby helping the covering 50 to be bonded and fixed to a plurality of cell assemblies 11, and further restricting the flow of the first resin material. Optionally, the covering 50 is elastic. The size of the covering 50 is smaller than the size of an outer circumference of the plurality of cell assemblies 11, thereby enabling the covering 50 to exert a pressure on the plurality of cell assemblies 11, and further restricting the flow of the first resin material.

Figure 18:
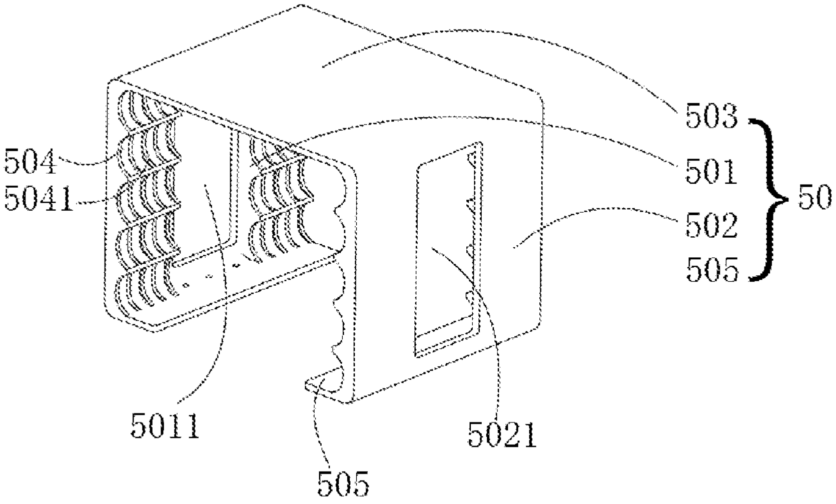
FIG. 18 is a schematic structural diagram of a covering of a battery pack according to another embodiment of this application.
Figure 19:
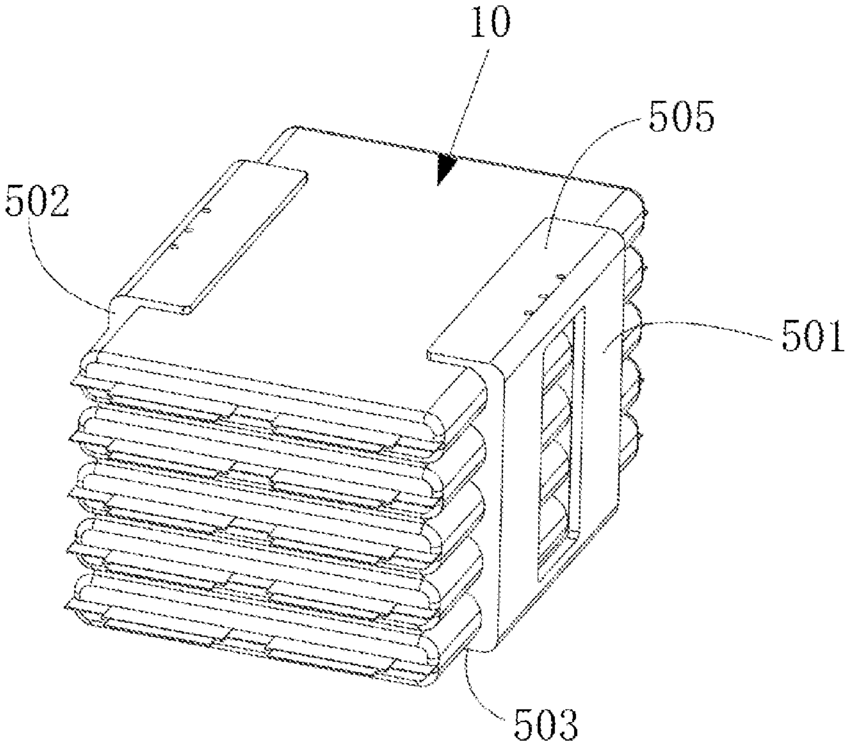
FIG. 19 is a schematic assembling diagram of a covering and a battery module of a battery pack according to an embodiment of this application.

In some embodiments, as shown in FIG. 18 to FIG. 19, the first covering 51 and the second covering 52 are integrally formed into the covering 50. The covering 50 contains a first section 501, a second section 502, a third section 503, and a fourth section 505. The third section 503 is connected to one end of the first section 501 and the second section 502, and the fourth section 505 is connected to the other end of the first section 501 and the second section 502. The third section 503 covers the first surface 10*b*. Along the third direction X, the fourth section 505 covers a part of the second surface 10*c*, thereby reducing the shaking of the cell assembly 11.

In some embodiments, the first section 501 contains a seventh through-hole 5011. The second section 502 contains an eighth through-hole 5021. The seventh through-hole 5011 is disposed opposite to the eighth through-hole 5021. The seventh through-hole 5011 and the eighth through-hole 5021 at least partly overlap the channel 10*a* in the third direction X. The seventh through-hole 5011 and the eighth through-hole 5021 facilitate ventilation between the passage 10*a* and the outside air, and facilitate heat dissipation inside the battery pack.

In some embodiments, the first section 501 and the second section 502 each contain a recessed portion 504. A lateral edge of the cell module 10 along the third direction X is accommodated in the recessed portion 504. The recessed portion 504 may be configured to limit the position of the cell module 10, and alleviate the shaking of the cell assembly 10 in the battery pack housing. In addition, the recessed portion 504 may store some glue to facilitate bonding and fixing of the cell assembly 10.

In some embodiments, a bottom of the recessed portion 504 includes a bulge 5041 that extends toward the cell module 10. The bulge 5041 slows down the flow of glue in the recessed portion 504, and facilitates bonding and fixing of the cell module 10.

For the first resin layer 20 and the second resin layer 30, as shown in FIG. 2, FIG. 7. and FIG. 8, the first resin layer 20 is disposed in the first region 12, and the second resin layer 30 is disposed in the second region 13. The first resin layer 20 is formed by disposing the first resin material in and fixing the first resin material to the first region 12. The second resin layer 30 is formed by disposing the second resin material in and fixing the second resin material to the second region 13. The first resin layer 20 is bonded to the first covering 51. The second resin layer 30 is bonded to the second covering 52. The first resin layer 20 is configured to bond the plurality of cells, and bond and fix the plurality of cells to the first housing 71. The second resin layer 30 is configured to bond the plurality of cells, and bond and fix the plurality of cells to the second housing 72. The first resin material and the second resin material include a pouring sealant. The pouring sealant is poured into the first region 12 from the third through-hole 705, and into the second region 13 from the fourth through-hole 706. The pouring sealant poured into the first region 12 forms the first resin layer 20 after being cured. The pouring sealant poured into the second region 13 forms the second resin layer 30 after being cured.

Understandably, the pouring method of the first resin layer 20 and the second resin layer 30 may be potting or injection molding, such as low-pressure injection molding. In this embodiment, the pouring sealant of the first resin layer 20 and the second resin layer 30 can exert effects of bonding, sealing, potting, and coating protection for the components. The first resin layer 20 and the second resin layer 30 include an epoxy resin pouring sealant. Understandably, the first resin layer 20 and the second resin layer 30 are not limited to the epoxy resin pouring sealant. In some other embodiments, the first resin layer 20 and the second resin layer 30 may other types of pouring sealant instead.

For the heat transfer piece 100, as shown in FIG. 2 and FIG. 7, the heat transfer piece 100 covers the outer surface that is of each cell assembly 11 and that is located in the second region 13. The heat transfer piece 100 is located between the covering 50 and the cell assembly 11. The heat transfer piece 100 is configured to conduct outward the heat generated by the cell, and then expel the heat out of the battery pack 01 through the channel 10*a* between the cell assemblies 11, thereby reducing the internal temperature of the battery pack 01.

In some embodiments, the heat transfer piece 100 covers a part of a surface that is of each cell assembly 11 and that is located in the first region 12.

In some embodiments, the heat transfer piece 100 covers a part of a surface that is of each cell assembly 11 and that is located in the third region 14.

In some embodiments, the heat transfer piece 100 is an aluminum shell. The aluminum shell is of high thermal conductivity, and helps expel the heat generated by the cell.

In order to illustrate more clearly the heat dissipation effect achieved by the channel 10*a* based on the technical solution hereof, some embodiments of this application provide a comparative test on three cell assemblies stacked in different stacking sequences and on the channels of different widths.

Test materials: the first cell assembly 101, the second cell assembly 102, and the third cell assembly 103, where the first cell assembly 101 includes 2 cells, the second cell assembly 102 includes 2 cells, and the third cell assembly 103 includes 1 cell.

Test conditions: The wind speed in the external environment is 2 m/s, and the maximum temperature of the cell is set to 70° C.

Existing solution: The first cell assembly 101, the second cell assembly 102, and the third cell assembly 103 are stacked in sequence along the first direction Z. No channel 10*a* is disposed between the first cell assembly 101, the second cell assembly 102, and the third cell assembly 103. The time required for the currently set temperature of the cell of the battery pack to cool down from the maximum temperature of 70° C. to 55° C., 45° C., and 35° C. is tested separately.

Solution I: As shown in FIG. 11, the first cell assembly 101, the second cell assembly 102, and the third cell assembly 103 are stacked in sequence along the first direction Z. A channel 10*a* is disposed between the first cell assembly 101, the second cell assembly 102, and the third cell assembly 103. The width of the channel 10*a* in the first direction Z is set to 1.6 mm. The time required for the currently set temperature of the cell of the battery pack to cool down from the maximum temperature of 70° C. to 55° C., 45° C., and 35° C. is investigated separately.

Solution II: As shown in FIG. 12, the first cell assembly 101, the second cell assembly 102, and the third cell assembly 103 are stacked in sequence along the first direction Z. A channel 10*a* is disposed between the first cell assembly 101, the second cell assembly 102, and the third cell assembly 103. The width of the channel 10*a* in the first direction Z is set to 3 mm. The time required for the currently set temperature of the cell of the battery pack to cool down from the maximum temperature of 70° C. to 55° C., 45° C., and 35° C. is investigated separately.

Solution III: As shown in FIG. 13, the first cell assembly 101, the third cell assembly 103, and the second cell assembly 102 are stacked in sequence along the first direction Z. A channel 10*a* is disposed between the first cell assembly 101, the third cell assembly 103, and the second cell assembly 102. The width of the channel 10*a* in the first direction Z is set to 3 mm. The time required for the currently set temperature of the cell of the battery pack to cool down from the maximum temperature of 70° C. to 55° C., 45° C., and 35° C. is investigated separately.

Solution IV: As shown in FIG. 14, the third cell assembly 103, the first cell assembly 101, and the second cell assembly 102 are stacked in sequence along the first direction Z. A channel 10*a* is disposed between the third cell assembly 103, the first cell assembly 101, and the second cell assembly 102. The width of the channel 10*a* in the first direction Z is set to 3 mm. The time required for the currently set temperature of the cell of the battery pack to cool down from the relatively high temperature of 70° C. to 55° C., 45° C., and 35° C. is investigated separately.

Table 1 shows the analysis results.

TABLE 1

| | Cooled to 55° C. (min) | Cooled to 45° C. (min) | Cooled to 35° C. (min) |
|---|---|---|---|
| Existing solution | 12.6 | 26.3 | 49.7 |
| Solution I | 10.8 | 21.3 | 38.7 |
| Solution II | 8.7 | 17.9 | 32.9 |
| Solution III | 8.0 | 16.2 | 29.8 |
| Solution IV | 6.4 | 14.6 | 29.4 |

As can be seen from the comparison of test data between Existing Solution and Solution I in Table 1, the channel 10*a* is not disposed in the Existing Solution, and it takes a relatively long time cool down the cell in the Existing Solution from the relatively high temperature of 70° C. to 55° C., 45° C., and 35° C. separately. Specifically, the time required for cooling the cell from 70° C. to 55° C. in Solution I is 1.8 minutes shorter than the time required in the Existing Solution. The time required for cooling the cell from 70° C. to 45° C. in Solution I is 5 minutes shorter than the time required in the Existing Solution. The time required for cooling the cell from 70° C. to 35° C. in Solution I is 11 minutes shorter than the time required in the Existing Solution.

As can be seen from the comparison of test data between Solution I and Solution II in Table 1, in a case that the stacking method of the three cell assemblies is the same, the width of the channel 10*a* in the first direction Z exerts an impact on the heat dissipation of the cell. When the width of the channel 10*a* in the first direction Z is relatively large, the heat dissipation effect brought by the channel 10*a* to the cell is relatively high. Specifically, the time required for cooling the cell from 70° C. to 55° C. in Solution II is 2.1 minutes shorter than the time required in the Solution I. The time required for cooling the cell from 70° C. to 45° C. in Solution II is 3.4 minutes shorter than the time required in the Solution I. The time required for cooling the cell from 70° C. to 35° C. in Solution II is 5.8 minutes shorter than the time required in the Solution I.

As can be seen from the comparison of test data between Solution II and Solution III in Table 1, in a case that the width of the channel 10*a* in the first direction Z is the same, the stacking sequence of the three cell assemblies exerts an impact on the heat dissipation of the cell. The heat dissipation effect for the cell in Solution III is relatively high. Specifically, the time required for cooling the cell from 70° C. to 55° C. in Solution III is 0.7 minute shorter than the time required in Solution II. The time required for cooling the cell from 70° C. to 45° C. in Solution III is 1.7 minutes shorter than the time required in Solution II. The time required for cooling the cell from 70° C. to 35° C. in Solution III is 3.1 minutes shorter than the time required in Solution II.

As can be seen from the comparison of test data between Solution III and Solution IV in Table 1, in a case that the width of the channel 10*a* in the first direction Z is the same, the stacking sequence of the three cell assemblies exerts an impact on the heat dissipation of the cell. The heat dissipation effect for the cell in Solution IV is the highest. Specifically, the time required for cooling the cell from 70° C. to 55° C. in Solution IV is 1.6 minutes shorter than the time required in Solution III. The time required for cooling the cell from 70° C. to 45° C. in Solution IV is 1.6 minutes shorter than the time required in Solution III. The time required for cooling the cell from 70° C. to 35° C. in Solution IV is 0.4 minute shorter than the time required in Solution III.

To sum up, the heat dissipation effect in a solution that disposes the channel 10*a* between the three cell components is higher than that in the Existing Solution (without the channel 10*a*). In addition, when the width of the channel 10*a* in the first direction Z is 3 mm, the heat dissipation effect is relatively high. Further, the stacking sequence of the three cell assemblies in the first direction Z exerts an impact on the heat dissipation of the cell. When the three cell assemblies are stacked along the first direction Z in a sequence from the third cell assembly 103 to the first cell assembly 101 and then to the second cell assembly 102, the heat dissipation effect of the cell is relatively high.

In some embodiments of this application, the cell module 10, the covering 50, the first resin layer 20, and at least one first structural member 40 are disposed. The cell module 10 includes a plurality of cell assemblies 11 stacked along the first direction Z. The cell module 10 includes a first surface 10*b* and a second surface 10*c* that are disposed opposite to each other along the first direction Z, and includes a first lateral face 10*d* and a second lateral face 10*e* that are disposed opposite to each other along the third direction X. The covering includes a first section 501, a second section 502, and a third section 503 connected to the first section 501 and the second section 502. The first section 501 covers at least a part of the first lateral face 10*d*. The second section 502 covers at least a part of the second lateral face 10*e*. The third section 503 covers the first surface 10*b*. The cell module 10 includes a first region 12 and a second region 13 that are located on two sides of one of the at least one covering 50 respectively along a second direction Y. The first direction Z, the second direction Y, and the third direction X are perpendicular to one another. The first resin layer 20 is formed by disposing a first resin material in and then fixing the first resin material to the first region 12. The first resin layer 20 is bonded to the covering. In addition, the at least one first structural member 40 is disposed between two adjacent cell assemblies 11 to partition the two adjacent cell assemblies 11 and form a channel 10*a*. A part of the channel 10*a*, which is located in the second region 13, includes a clearance. The channel 10*a* is ventilative to outside air. The channel 10*a* can expel the heat, which is generated in the cell assembly 11, out of the battery pack to reduce the internal temperature of the battery pack. In addition, an external blower or an air exhauster may be disposed at the channel 10*a* to accelerate ventilation in the channel 10*a*, improve heat dissipation of the battery pack 01, and in turn, reduce the internal temperature of the entire battery pack 01.

This application further provides an embodiment of an electrical device. The electrical device includes the foregoing battery pack. The electrical device includes, but is not limited to, agricultural unmanned aerial vehicles, two-wheeled electric vehicles, energy storage devices, and hand-held electrical tools. The functionality and structure of the battery pack can be learned by referring to the foregoing some embodiments, and are omitted herein.

What is described above is merely some embodiments of this application, and in no way thereby limits the patent scope of this application. All equivalent structural variations and equivalent process variations made by using the content of the specification and the drawings of this application, and the direct and indirect use of the content in other related technical fields, still fall within the patent protection scope of this application.

What is claimed is:

1. A battery pack, comprising:

a battery pack housing;

a cell module comprising a plurality of cell assemblies stacked along a first direction;

at least one covering;

a first resin layer; and at least one first structural member;

wherein, the battery pack housing comprises a first housing and a second housing connected to each other;

each cell assembly comprises at least one cell;

the cell module comprises a first surface, a second surface, a first lateral face, and a second lateral face;

the first surface and the second surface are disposed opposite to each other along the first direction, and the first lateral face and the second lateral face are disposed opposite to each other along a third direction;

each covering comprises a first section, a second section, and a third section connected to the first section and the second section, wherein the first section covers at least a part of the first lateral face, the second section covers at least a part of the second lateral face, and the third section covers at least a part of the first surface;

the cell module comprises a first region and a second region;

along a second direction, the first region and the second region are located on two sides of one of the at least one covering, respectively;

the first resin layer comprises a first resin material, wherein the first resin layer is bonded to the at least one covering, the first resin layer is disposed in the first region, the first resin layer bonds and fixes the cells of the plurality of cell assemblies to the first housing, and the first resin material comprises a pouring sealant; and each first structural member is disposed between two adjacent cell assemblies to partition the two adjacent cell assemblies and form a channel between the two adjacent cell assemblies, wherein a part of the channel located in the second region comprises a clearance, and wherein the at least one covering is configured to restrict flow of the first resin material into the channel.

2. The battery pack according to claim 1, wherein the battery pack housing contains an accommodation cavity, a first through-hole, and a second through-hole; wherein along the third direction, the first through-hole and the second through-hole are disposed opposite to each other; wherein both the first through-hole and the second through-hole communicate with the accommodation cavity;

wherein the cell module is accommodated in the accommodation cavity; and wherein the first through-hole and the second through-hole at least partly overlap the channel in the third direction.

3. The battery pack according to claim 2, wherein the at least one covering partly overlaps the first through-hole and the second through-hole in the third direction.

4. The battery pack according to claim 2, wherein the first housing and the second housing form the accommodation cavity of the cell module, the first housing contains a third through-hole communicating with the accommodation cavity, and the third through-hole is located above the first region along an opposite direction of the first direction.

5. The battery pack according to claim 1, wherein the first section and the second section contain a recessed portion, and a lateral edge of the cell module along the third direction is accommodated in the recessed portion.

6. The battery pack according to claim 1, wherein each cell comprises an electrode assembly, a cell housing configured to accommodate the electrode assembly, and a tab connected to the electrode assembly and extending out of the cell housing; and the cell housing comprises a first part and a second part, the first part configured to accommodate the electrode assembly, the second part extending outward from the first part, the tab extends out of the cell housing from the second part along the second direction, and a part of the tab extending out of the cell housing is located in the first region.

7. The battery pack according to claim 1, wherein the at least one covering comprises a first covering and a second covering; the first covering and the second covering are disposed in sequence along the second direction-; and the cell module further comprises a third region; the first region, the second region, and the third region are disposed in sequence along the second direction; the first covering is located between the first region and the second region; and the second covering is located between the second region and the third region.

8. The battery pack according to claim 7, wherein the battery pack further comprises a second resin layer, wherein the second resin layer is bonded to the second covering.

9. The battery pack according to claim 7, wherein the battery pack further comprises a heat transfer piece, and the heat transfer piece covers an outer surface of each cell assembly located in the second region.

10. The battery pack according to claim 9, wherein the heat transfer piece covers a part of a surface of each cell assembly located in the first region, and the heat transfer piece covers a part of a surface of each cell assembly located in the third region.

11. The battery pack according to claim 7, wherein the first covering is spaced apart from the second covering.

12. The battery pack according to claim 1, wherein the covering comprises a fourth section, the fourth section connects the first section to the second section, the fourth section is disposed opposite to the third section, and the fourth section covers the second surface.

13. The battery pack according to claim 12, wherein the at least one covering has an annular structure.

14. The battery pack according to claim 1, wherein the battery pack further comprises an adapter assembly, the adapter assembly comprises an adapter plate and an adapter piece, the adapter plate is disposed on a first lateral face of the cell module, the adapter piece is disposed on the adapter plate, the adapter piece is connected to a cell of a cell assembly.

15. The battery pack according to claim 14, wherein the first resin layer covers the adapter plate.

16. The battery pack according to claim 1, wherein the first section contains a seventh through-hole, the second section contains an eighth through-hole, the seventh through-hole is disposed opposite to the eighth through-hole, and the seventh through-hole and the eighth through-hole at least partly overlap the channel in the third direction.

17. The battery pack according to claim 1, wherein the at least one covering is elastic, a size of the at least one covering is smaller than a size of an outer circumference of the plurality of cell assemblies, the at least one covering exerts a pressure on the plurality of cell assemblies.

18. The battery pack according to claim 1, wherein the first structural member includes foam, the foam provides an expansion space for the expansion of a cell of a cell assembly.

19. The battery pack according to claim 18, wherein a part of the first structural member is disposed in the first region.

20. An electrical device, wherein the electrical device comprises the battery pack according to claim 1.

* * * * *